US012579880B2

(12) United States Patent
Wu

(10) Patent No.: US 12,579,880 B2
(45) Date of Patent: Mar. 17, 2026

(54) FLOOD ALARM SYSTEM AND FLOOD ALARM METHOD

(71) Applicants: Pin-Yi Wu, Taipei CIty (TW); Hui-Chih Chang, Taipei City (TW)

(72) Inventor: Pin-Yi Wu, Taipei City (TW)

(73) Assignees: Pin-Yi Wu, Taipei City (TW); Hui-Chih Chang, Taipei City (TW)

( * ) Notice: Subject to any disclaimer, the term of this patent is extended or adjusted under 35 U.S.C. 154(b) by 0 days.

(21) Appl. No.: 18/792,585

(22) Filed: Aug. 2, 2024

(65) Prior Publication Data

US 2025/0336280 A1 Oct. 30, 2025

(30) Foreign Application Priority Data

Apr. 30, 2024 (TW) ................................ 113116093

(51) Int. Cl.
*G08B 21/10* (2006.01)
*G08B 25/10* (2006.01)

(52) U.S. Cl.
CPC ............ *G08B 21/10* (2013.01); *G08B 25/10* (2013.01)

(58) Field of Classification Search
CPC ...... G08B 21/10; G08B 21/182; G08B 25/10; Y02A 10/40; G01F 23/0007
See application file for complete search history.

(56) References Cited

U.S. PATENT DOCUMENTS

2017/0083747 A1 3/2017 Guan et al.

FOREIGN PATENT DOCUMENTS

| | | | | | |
|---|---|---|---|---|---|
| CN | 111325949 | A | * | 6/2020 | G08B 21/10 |
| CN | 216116253 | U | | 3/2022 | |
| CN | 216190169 | U | | 4/2022 | |
| CN | 115588277 | A | * | 1/2023 | G08B 21/10 |
| CN | 220155005 | U | | 12/2023 | |
| CN | 117676376 | A | | 3/2024 | |
| KR | 101395262 | B1 | * | 5/2014 | G08B 25/10 |
| KR | 20160071606 | A | * | 6/2016 | G08B 21/182 |
| KR | 102582180 | B1 | * | 9/2023 | G06Q 50/26 |
| TW | M484875 | U | | 8/2014 | |
| TW | M637957 | U | * | 2/2023 | |

* cited by examiner

*Primary Examiner* — Andrew W Bee

(74) *Attorney, Agent, or Firm* — Li & Cai Intellectual Property Office

(57) ABSTRACT

A flood alarm system and a flood alarm method are provided. The flood alarm system includes a sensing device and an alarm device. The sensing device includes a waterproof housing and an accommodating space, and is configured to detect a height of standing water that flows into the accommodating space through multiple water inlet holes on the waterproof housing. Multiple instructions that respectively correspond to multiple flood heights are stored in the sensing device. The alarm device is in wireless communication with the sensing device. In response to detecting that the height of the standing water that flows into the accommodating space meets one of the flood heights, the sensing device outputs the instruction that corresponds to the flood height. In response to receiving the instruction output by the sensing device, the alarm device executes an alarm procedure that corresponds to the instruction.

18 Claims, 6 Drawing Sheets

FLOOD ALARM SYSTEM AND FLOOD ALARM METHOD

CROSS-REFERENCE TO RELATED PATENT APPLICATION

This application claims the benefit of priority to Taiwan Patent Application No. 113116093, filed on Apr. 30, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a flood alarm system, and more particularly to a flood alarm system in which an alarm device is separate from a sensing device, and the alarm device can execute alarm procedures of different levels according to different heights of standing water that are detected by the sensing device.

BACKGROUND OF THE DISCLOSURE

In conventional flood alarms, a flood sensor is usually positioned near the ground, and an alarm is positioned on a top portion thereof. Such installation locations do not allow real-time detection of a flood height and identification of a flood warning to be achieved at the same time. While the flood height can be immediately detected with flood alarms that are installed in low-lying areas, relevant personnel may have difficulty noticing a warning emitted from such a flood alarm. On the other hand, when the flood alarms are installed on high ground and in conspicuous locations, a flood level cannot be instantly and effectively detected.

Therefore, how to effectively enhance the sensitivity of the flood alarm and a warning effect through improvements in structural design of the flood alarm, so as to overcome the above-mentioned disadvantages, has become one of the important issues to be solved in the relevant industry.

SUMMARY OF THE DISCLOSURE

In response to the above-referenced technical inadequacies, the present disclosure provides a flood alarm system and a flood alarm method, in which an alarm device is separate from a sensing device, and the alarm device can execute alarm procedures of different levels according to different heights of standing water that are detected by the sensing device.

In order to solve the above-mentioned problems, one of the technical aspects adopted by the present disclosure is to provide a flood alarm system, which includes a sensing device and an alarm device. The sensing device includes a waterproof housing and an accommodating space, and is configured to detect a height of standing water that flows into the accommodating space through a plurality of water inlet holes on the waterproof housing. A plurality of instructions that respectively correspond to a plurality of flood heights are stored in the sensing device. In response to detecting that the height of the standing water that flows into the accommodating space meets one of the flood heights, the sensing device outputs the instruction that corresponds to the flood height. The alarm device is in wireless communication with the sensing device, and a plurality of alarm procedures that respectively correspond to the instructions are stored in the alarm device. In response to receiving the instruction output by the sensing device, the alarm device is configured to execute the alarm procedure that corresponds to the instruction.

In order to solve the above-mentioned problems, another one of the technical aspects adopted by the present disclosure is to provide a flood alarm method. The flood alarm method includes: configuring a sensing device that includes a waterproof housing and an accommodating space to detect a height of standing water that flows into the accommodating space through a plurality of water inlet holes on the waterproof housing, in which a plurality of instructions that respectively correspond to a plurality of flood heights are stored in the sensing device; and configuring, in response to detecting that the height of the standing water that flows into the accommodating space meets one of the flood heights, the sensing device to output the instruction that corresponds to the flood height to an alarm device. The alarm device is in wireless communication with the sensing device, and a plurality of alarm procedures that respectively correspond to the instructions are stored in the alarm device. The flood alarm method further includes: configuring, in response to receiving the instruction output by the sensing device, the alarm device to execute the alarm procedure that corresponds to the instruction.

Therefore, in the flood alarm system and the flood alarm method provided by the present disclosure, by virtue of "the alarm device being in wireless communication with the sensing device," "a plurality of instructions that respectively correspond to a plurality of flood heights being stored in the sensing device," "in response to detecting that the height of the standing water that flows into the accommodating space meets one of the flood heights, the sensing device outputting the instruction that corresponds to the flood height," "a plurality of alarm procedures that respectively correspond to the instructions being stored in the alarm device," and "in response to receiving the instruction output by the sensing device, the alarm device being configured to execute the alarm procedure that corresponds to the instruction," the alarm device and the sensing device can be separate from each other, and the alarm device can execute the alarm procedures of different levels according to different heights of the standing water that are detected by the sensing device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
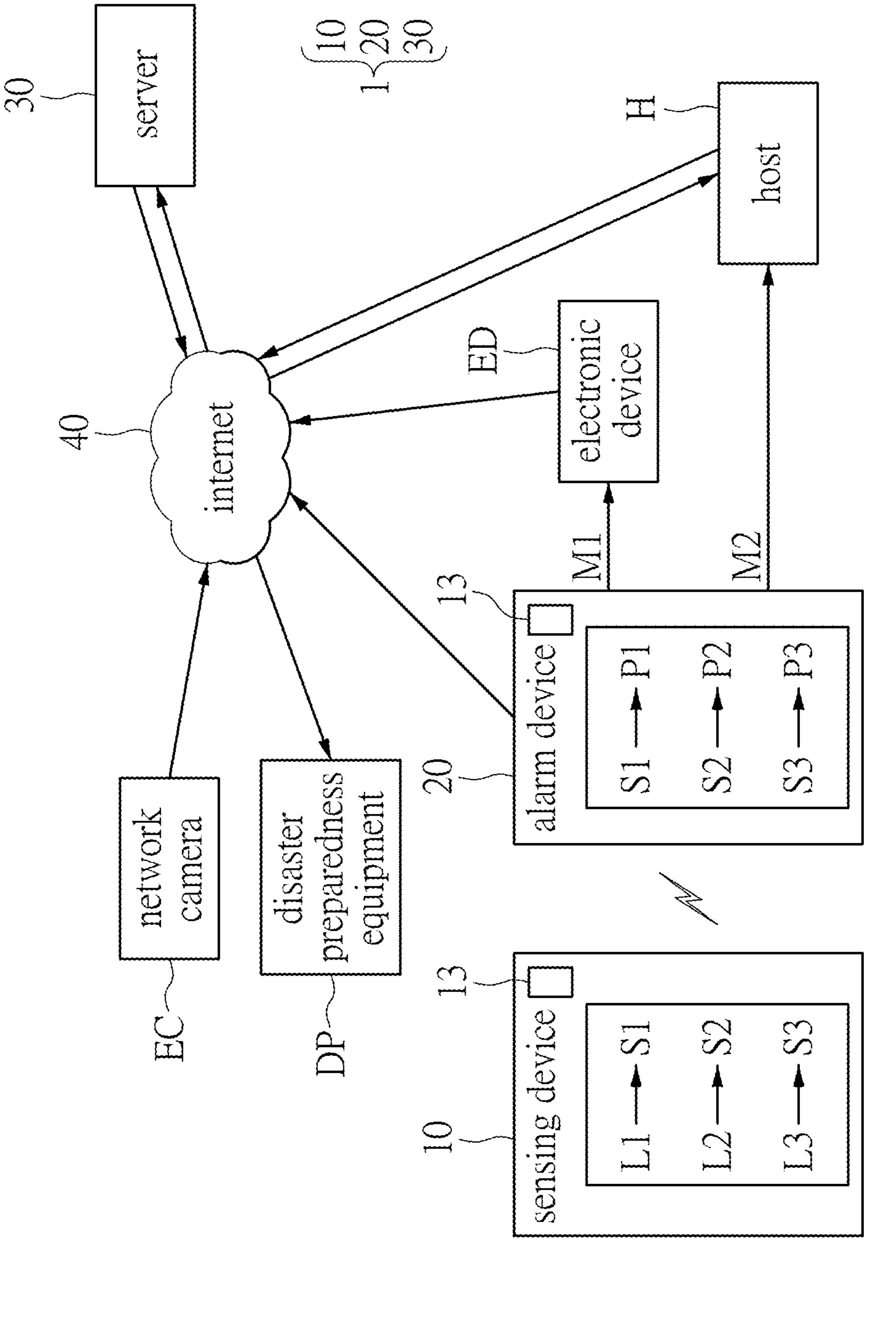
FIG. 1 is a schematic diagram of a flood alarm system according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
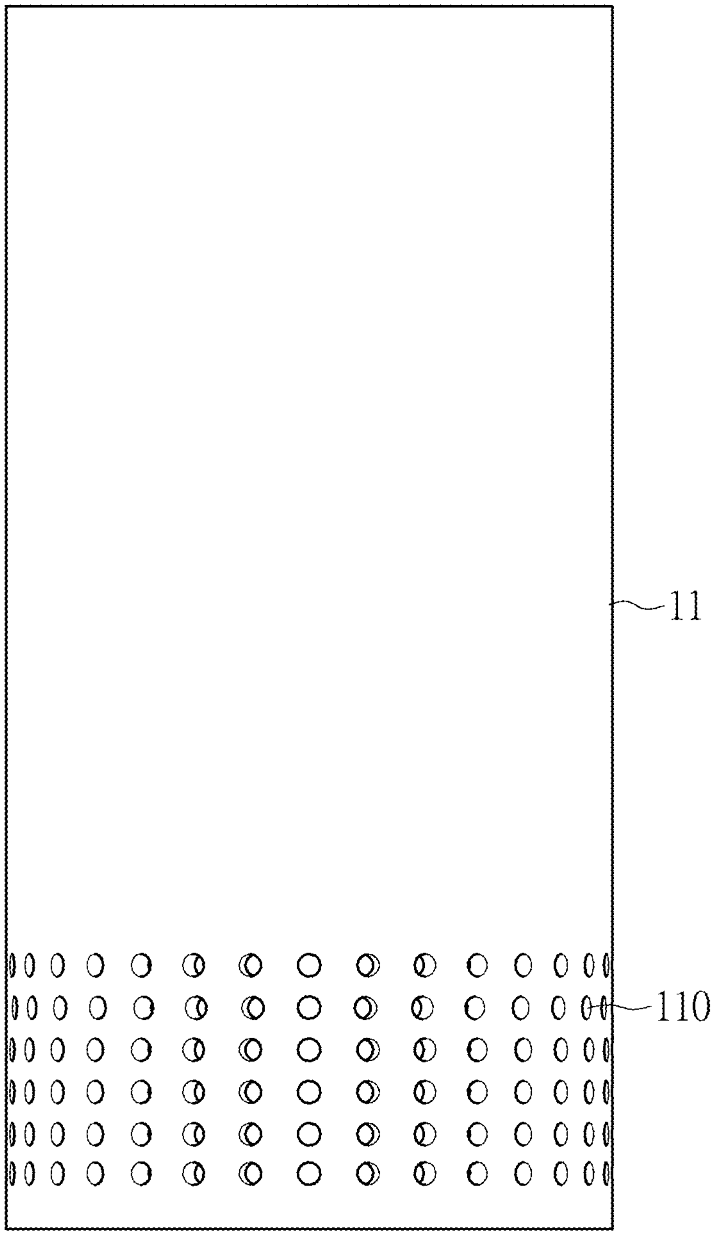
FIG. 2 is a schematic view of a sensing device of FIG. 1.

Referring to FIG. 1 and FIG. 2, FIG. 1 is a schematic diagram of a flood alarm system according to the present disclosure, and FIG. 2 is a schematic view of a sensing device of FIG. 1.

As shown in FIG. 1 and FIG. 2, an embodiment of the present disclosure provides a flood alarm system 1. The flood alarm system 1 includes a sensing device 10 and an alarm device 20. As shown in FIG. 2, the sensing device 10 includes a waterproof housing 11 and an accommodating space 12, and is configured to detect a height of standing water that flows into the accommodating space 12 through a plurality of water inlet holes 110 on the waterproof housing 11.

Furthermore, a plurality of instructions that respectively correspond to a plurality of flood heights are stored in the sensing device 10. When the height of the standing water that flows into the accommodating space 12 is detected to meet one of the flood heights, the sensing device 10 outputs the instruction that corresponds to said flood height. In the present embodiment, three instructions (S1 to S3) that respectively correspond to three flood heights (L1 to L3) are stored in the sensing device 10. For example, a first flood height L1 is 3 centimeters, a second flood height L2 is 6 centimeters, and a third flood height L3 is 10 centimeters. However, the present disclosure is not limited thereto. As such, when the height of the standing water that flows into the accommodating space 12 is detected to meet the first flood height L1, the sensing device 10 outputs a first instruction S1. When the height of the standing water that flows into the accommodating space 12 is detected to meet the second flood height L2, the sensing device 10 outputs a second instruction S2. When the height of the standing water that flows into the accommodating space 12 is detected to meet the third flood height L3, the sensing device 10 outputs a third instruction S3.

The alarm device 20 is in wireless communication with the sensing device 10. Specifically, the alarm device 20 is in wireless communication with the sensing device 10 via a radio-frequency (RF) module, a BLUETOOTH module, or a WI-FI module, so that the sensing device 10 and the alarm device 20 can be separately installed. A wireless communication module of the present disclosure is capable of receiving various radio wave sources, and is not limited to those listed herein. Accordingly, the sensing device 10 can be installed in low-lying and flood-prone areas, and pedestrians and passing vehicles can still be effectively reminded despite the low installation location. The alarm device 20 can be installed on the high ground and in conspicuous locations, and occurrence of flooding can still be instantly detected despite the high installation location. For example, the sensing device 10 that is installed in an underpass can detect the height of the standing water, and output the instruction to the alarm device 20 on the ground level. The alarm device 20 can immediately send out a flood alarm for reminding the pedestrians and the passing vehicles not to enter flooded areas, so that casualties caused by disasters can be decreased.

Furthermore, a plurality of alarm procedures that respectively correspond to the instructions are stored in the alarm device 20. In response to receiving the instruction output by the sensing device 10, the alarm device 20 is configured to execute the alarm procedure that corresponds to the instruction. In the present embodiment, the alarm procedures stored in the alarm device 20 include a first alarm procedure P1, a second alarm procedure P2, and a third alarm procedure P3 that respectively correspond to the first instruction S1, the second instruction S2, and the third instruction S3.

The first alarm procedure P1 includes sending a flood announcement M1 to an electronic device ED. When receiving the first instruction S1 output by the sensing device 10, the alarm device 20 executes the first alarm procedure P1 and sends the flood announcement M1 to the electronic device ED. The electronic device ED of the present embodiment can be, for example, but is not limited to, a mobile device. The flood announcement M1 of the present embodiment can be a text message that provides flood-related information through textual content. For example, the flood announcement M1 is sent to vehicle owners in the vicinity as a reminder to move their vehicles to the high ground, so as to prevent or reduce property loss. The alarm device 20 is further configured to record the flood announcement M1 (especially messages sent to the electronic device ED). Such records are beneficial for attribution of responsibility after the disaster has occurred.

The second alarm procedure P2 includes generating a first warning sound. When receiving the second instruction S2 output by the sensing device 10, the alarm device 20 executes the second alarm procedure P2 to generate the first warning sound. In the present embodiment, the first warning sound can be an audio broadcast or a mid-low frequency sound. In addition, the third alarm procedure P3 includes generating a second warning sound that is different from the first warning sound. When receiving the third instruction S3 output by the sensing device 10, the alarm device 20 executes the third alarm procedure P3 to generate the second warning sound that is different from the first warning sound. In the present embodiment, the second warning sound can be a high-decibel audio broadcast or a high frequency sound. In the present disclosure, different warning sounds are generated according to different flood heights, so that relevant personnel can determine the seriousness of the disaster by the warning sound.

The first warning sound and the second warning sound are generated by a buzzer or a speaker, and the format of an audio includes an audio announcement, a tune, or a monophonic audio. In order to increase the recognizability of the flood alarm and effectively remind the pedestrians not to enter the flooded areas, a flood alarm sound of the alarm device 20 is set to be different from other warning sounds in the surrounding environment. Specifically, when the alarm device 20 is installed near public transportation (e.g., an entrance of an underground metro station), the alarm device 20 should avoid using sounds that closely represent birdsong or sirens, so that the pedestrians can be effectively reminded to stay away from the flooded areas.

According to different flood heights, the alarm device 20 of the present disclosure can further control a hazard light (not shown in the figures) to emit light signals of different colors. For example, the first alarm procedure P1 can further include controlling the hazard light to emit a blue light signal, the second alarm procedure P2 can further include controlling the hazard light to emit a yellow light signal, and the third alarm procedure P3 can further include controlling the hazard light to emit a red light signal. Accordingly, by using the red, yellow, and blue light signals to correspond to different flood heights in the present embodiment, the pedestrians or the passing vehicles can be reminded not to enter the flooded areas. While only the audio and the light signal are exemplified in the present embodiment, the way that the warning is generated by the alarm device 20 is not limited in the present disclosure.

The second alarm procedure P2 and the third alarm procedure P3 can further include sending a flood alarm M2 to a host H. The host H of the present embodiment is a computer of an operation center that has access to disaster preparedness equipment. The operation center can be, for example, a water resources unit, a central disaster preparedness center, or a transportation control center. When the height of the standing water meets the second flood height L2 or the third flood height L3, this can indicate that damage caused by water accumulation is serious. At this stage, the alarm device 20 can report to the operation center for carrying out a disaster preparedness measure.

Based on the above descriptions, the flood alarm system 1 of the present embodiment can further include a server 30, which is connected to the host H via an internet 40 and is configured to provide a real-time image to the host H. The real-time image is obtained by a network camera EC that is disposed adjacent to the sensing device 10. In addition, the host H or the electronic device ED can control disaster preparedness equipment DP via the server 30, so as to carry out the disaster preparedness measure. For example, the disaster preparedness equipment DP is a sluice gate or a pump, and the host H or the electronic device ED controls the sluice gate or activates the pump via the server 30. That is to say, the server 30 is configured to provide the real-time image obtained by the network camera EC to the host H, so that the operation center can use the real-time image for monitoring. After the operation center confirms flooding through the real-time image, the host H or the electronic device ED controls the sluice gate or activates the pump via the server 30. In the present embodiment, the server 30 also includes an application server, and applications of the host H or the electronic device ED can be connected to the application server for remotely controlling the sluice gate or activating the pump.

Actual implementations of the waterproof housing 11 and the accommodating space 12 of the sensing device 10 will be illustrated in the following descriptions. As shown in FIG. 2, the waterproof housing 11 has a hollow columnar or tubular shape, thereby allowing the sensing device 10 to be easily attached to a solid columnar structure (e.g., a utility pole, traffic lights, and a street lamp) in the low-lying areas. Hence, the sensing device 10 can be prevented from being washed away by torrents from heavy rainfall. The water inlet holes 110 are formed on the waterproof housing 11, and are disposed at an end of the waterproof housing 11 that is near the ground. The water inlet holes 110 penetrate through the waterproof housing 11, so that the accommodating space 12 is in spatial communication with an external environment. The sensing device 10 collects the standing water through the water inlet holes 110 from the end that is near the ground. The size of an aperture of the water inlet hole 110 can vary according to the environment in which the sensing device 10 is disposed. That is to say, the aperture is variable according to the size of foreign objects easily generated in the environment in which the sensing device 10 is disposed. In this way, the water inlet holes 110 are not easily blocked by the foreign objects in the environment, and do not lose the function of detecting flooding.

The material of the waterproof housing 11 is polyvinyl chloride (PVC). A partition 121 is provided in the accommodating space 12, and a space is formed by the partition 121 and the waterproof housing 11. This space is located at a side of the waterproof housing 11 that is away from the ground, and is used for placement of a sensor or a detector. The sensing device 10 includes one or a combination of an infrared water-level detector, a water conductivity sensor, and a float sensor. The above-mentioned sensor or detector is disposed at the side of the waterproof housing 11 that is away from the ground. That is, the sensor or the detector is disposed in the space formed by the partition 121 and the waterproof housing 11. In addition, a detection component of the sensor or the detector is exposed from the space, so that the height of the standing water in the accommodating space 12 can be detected. This space is separated from the accommodating space 12, so as to prevent intrusion of the standing water in the accommodating space 12 or rain from the outside (which may cause malfunction or misdetection of the sensing device 10).

Figure 3:
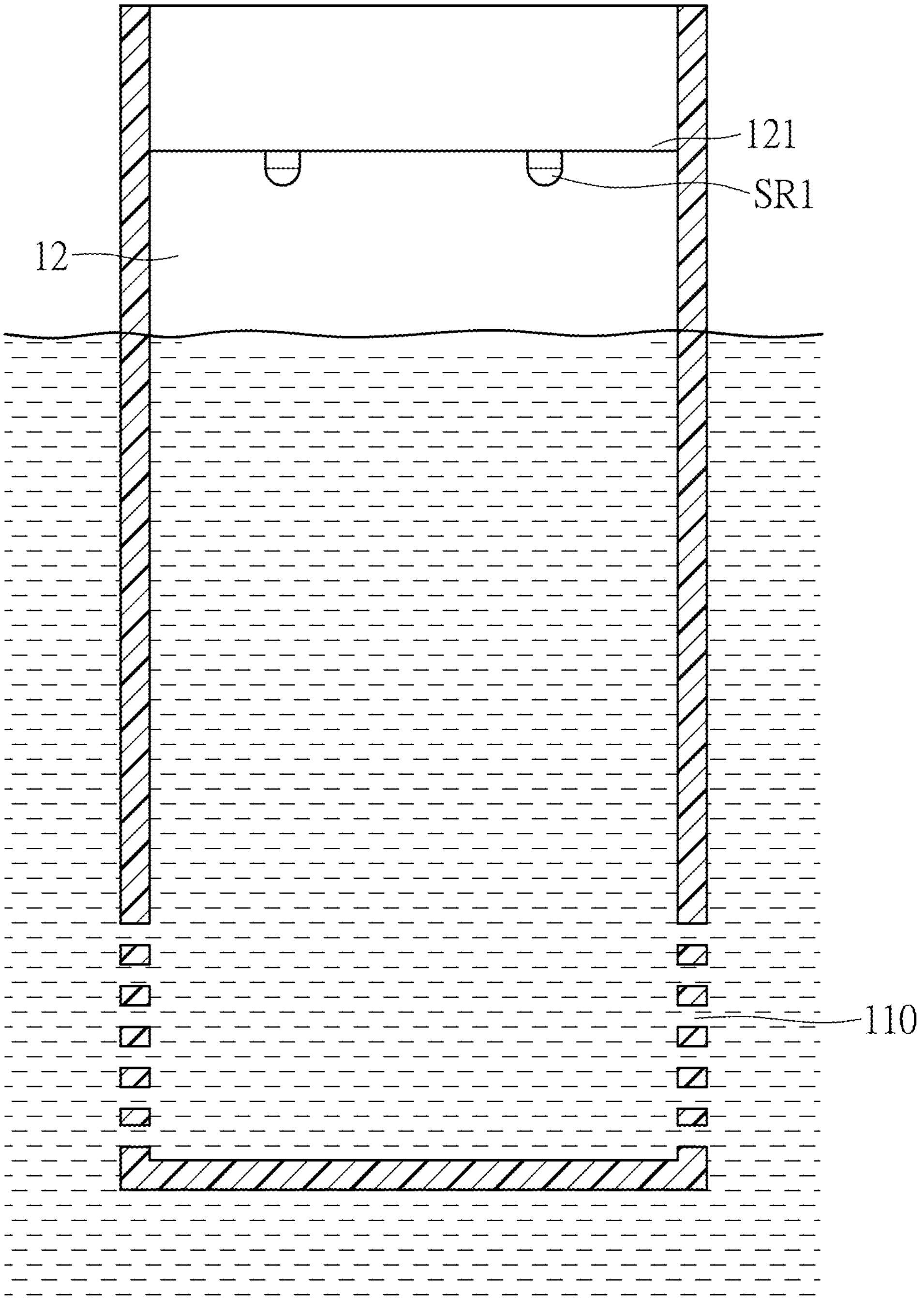
FIG. 3 is a schematic view showing the sensing device using a water conductivity sensor to detect a height of standing water that flows into an accommodating space.
Figure 4:
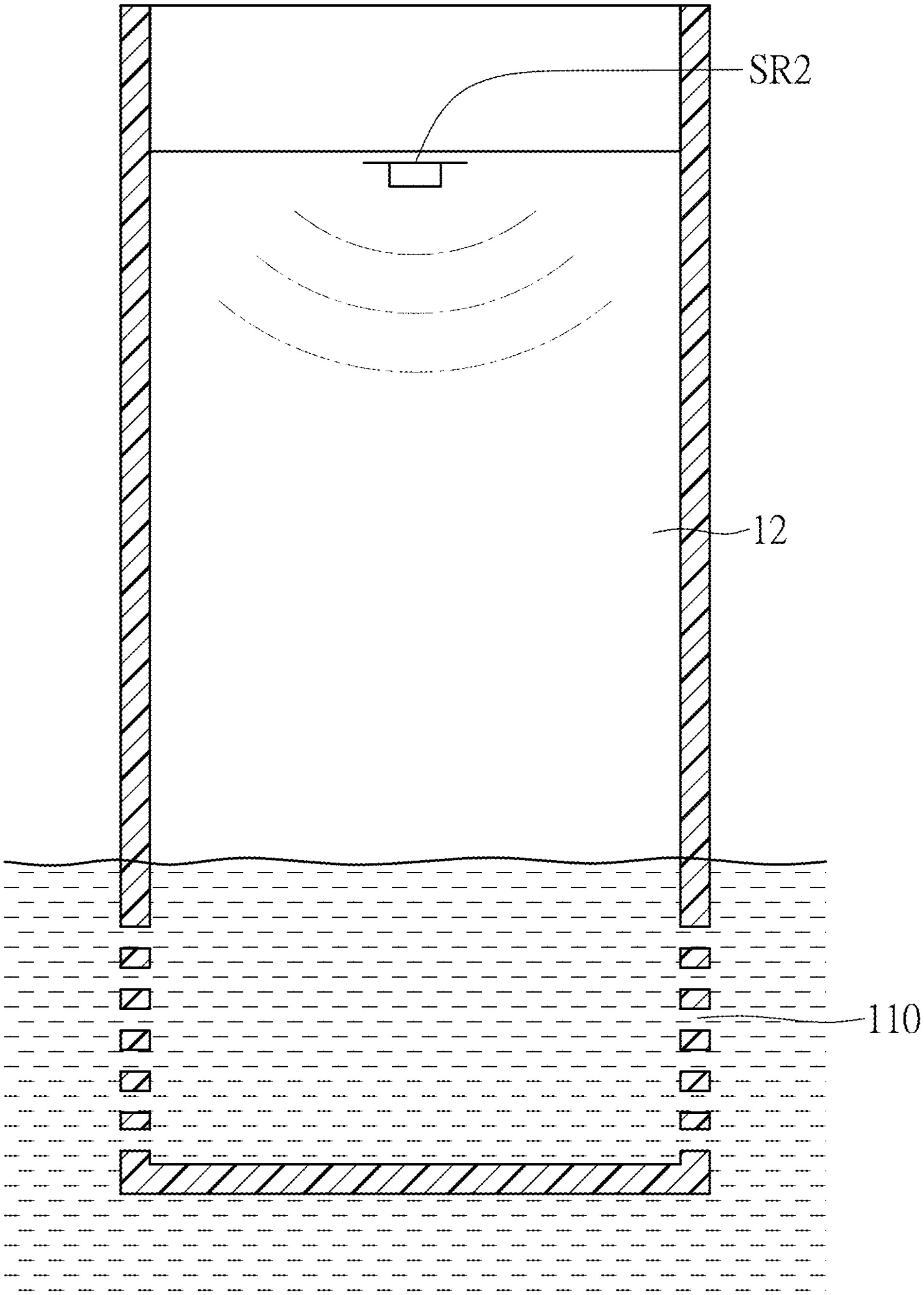
FIG. 4 is a schematic view showing the sensing device using an infrared water-level detector to detect the height of the standing water that flows into the accommodating space.

Referring to FIG. 3 and FIG. 4, FIG. 3 is a schematic view showing the sensing device using a water conductivity sensor to detect a height of standing water that flows into an accommodating space, and FIG. 4 is a schematic view showing the sensing device using an infrared water-level detector to detect the height of the standing water that flows into the accommodating space.

As shown in FIG. 3, when the standing water that flows into the accommodating space 12 increases and is in contact with a detection component of a water conductivity sensor SR1, the detection component will be triggered to obtain the height of the standing water. Since actuation of the float sensor is similar to that of the water conductivity sensor SR1, details thereof will not be reiterated herein.

As shown in FIG. 4, when the standing water flows into the accommodating space 12 through the water inlet holes 110, an infrared water-level detector SR2 emits infrared light to the accommodating space 12. By calculating a return time of the infrared light after being reflected from or refracted by water surface, the height of the standing water can be obtained.

The alarm device 20 of the present embodiment includes the buzzer and the hazard light, and a warning effect is achieved by light and sound. The alarm device 20 also includes an indoor alarm (not shown in the figures). The indoor alarm is in wireless communication with the alarm device 20, so as to expand a reporting range of the flood alarm. The indoor alarm can be installed indoors. For example, the indoor alarm can be installed in relevant local units (such as offices or security rooms of local neighborhoods), so that nearby residents can be immediately notified for taking disaster response measures.

Figure 5:
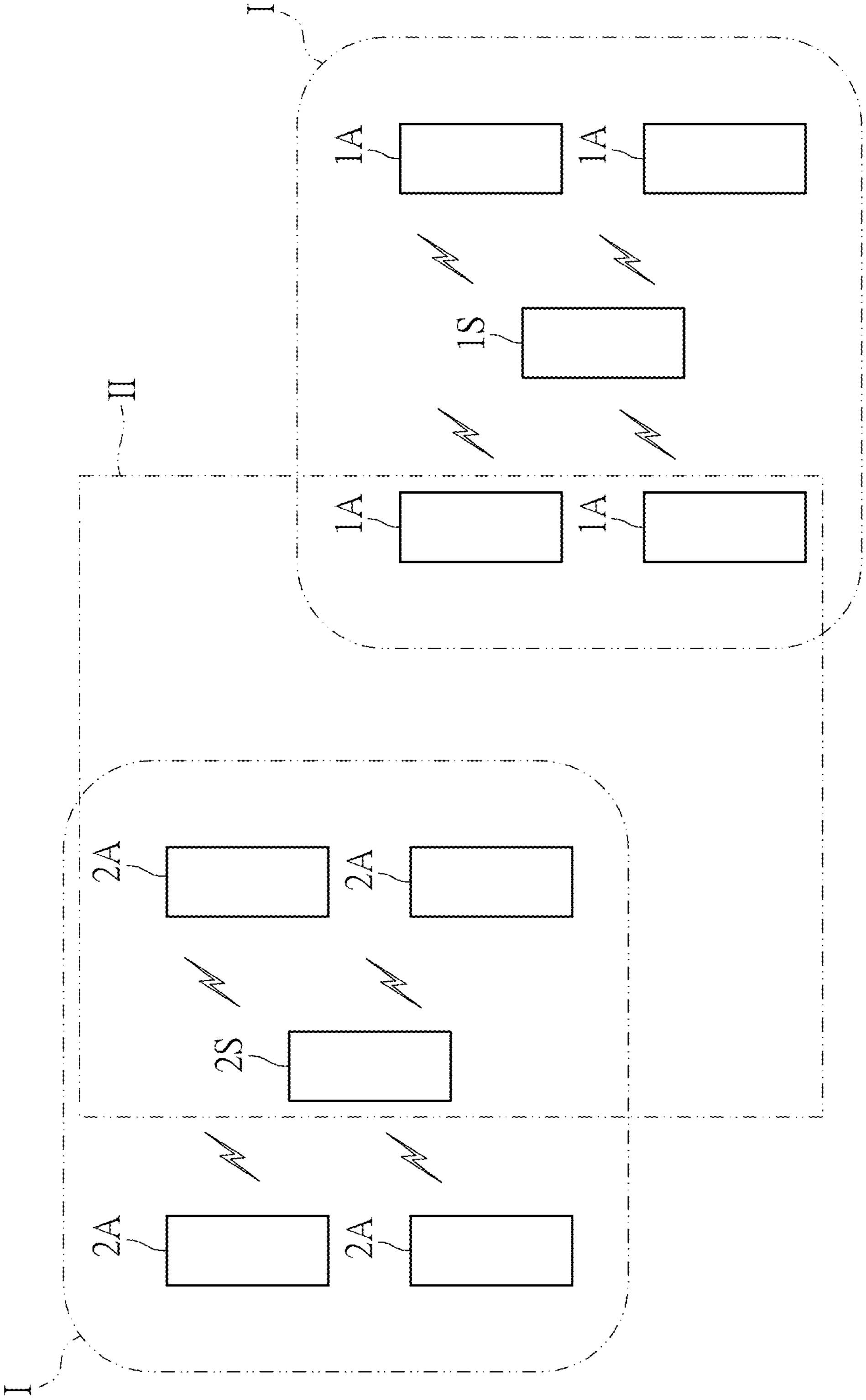
FIG. 5 is a schematic view showing group transmission of the flood alarm system according to the present disclosure.

In the present embodiment, the alarm device 20 and the sensing device 10 perform group setting via a pairing module 13. The alarm device 20 responds to the instruction output by the sensing device 10 of a same group, and executes the alarm procedure that corresponds to the instruction. In other embodiments, the flood alarm system 1 includes multiple ones of the sensing device 10 and multiple ones of the alarm device 20, and these sensing devices 10 and these alarm devices 20 are divided into multiple groups through a pairing process. The pairing process of the present disclosure can be a variety of pairing modes, such as one-to-one, one-to-many, many-to-one, or many-to-many. In the following descriptions, a one-to-one pairing mode I and a one-to-many pairing mode II will be illustrated. Referring to FIG. 5, FIG. 5 is a schematic view showing group transmission of the flood alarm system according to the present disclosure. In the one-to-one pairing mode I, the sensing device 10 that is encoded as 1S of a first group transmits the instruction to the alarm devices 20 that are encoded as 1A of the first group, and the sensing device 10 that is encoded as 2S of a second group transmits the instruction to the alarm devices 20 that are encoded as 2A of the second group. In the one-to-many pairing mode II, the alarm devices 20 that are encoded as 1A can also receive the instruction transmitted by the sensing device 10 that is encoded as 2S of the second group. Apart from outputting the instruction to the alarm devices 20 within a transmission range, the sensing device 10 of the present disclosure can also transmit the instruction to the alarm devices 20 that are assigned with specific group codes through setting of the pairing module 13. In the present disclosure, the sensing device 10 and the alarm device 20 are coupled to the pairing module 13 via a serial communication interface, and the pairing module 13 provides to the sensing device 10 and the alarm device 20 a set of codes for pairing purposes. Furthermore, in order for the public to easily identify flood locations, the alarm devices 20 of the same group can generate different tunes in the one-to-one pairing mode I. In the one-to-many pairing mode II, the many-to-one pairing mode, or the many-to-many pairing mode, the alarm devices 20 of different groups can also generate different tunes.

In the present embodiment, each of the alarm device 20 and the sensing device 10 includes a power module, and the power module can be a solar battery or a rechargeable battery for generating electricity to drive the alarm device 20 and the sensing device 10. In this way, it is not necessary for the alarm device 20 and the sensing device 10 to be connected to an external power supplier. The power module of the present disclosure can be a battery of any type, such as a replaceable battery or a stationary battery. However, the aforementioned examples describe only one of the embodiments of the present disclosure, and the present disclosure is not intended to be limited thereto.

Figure 6:
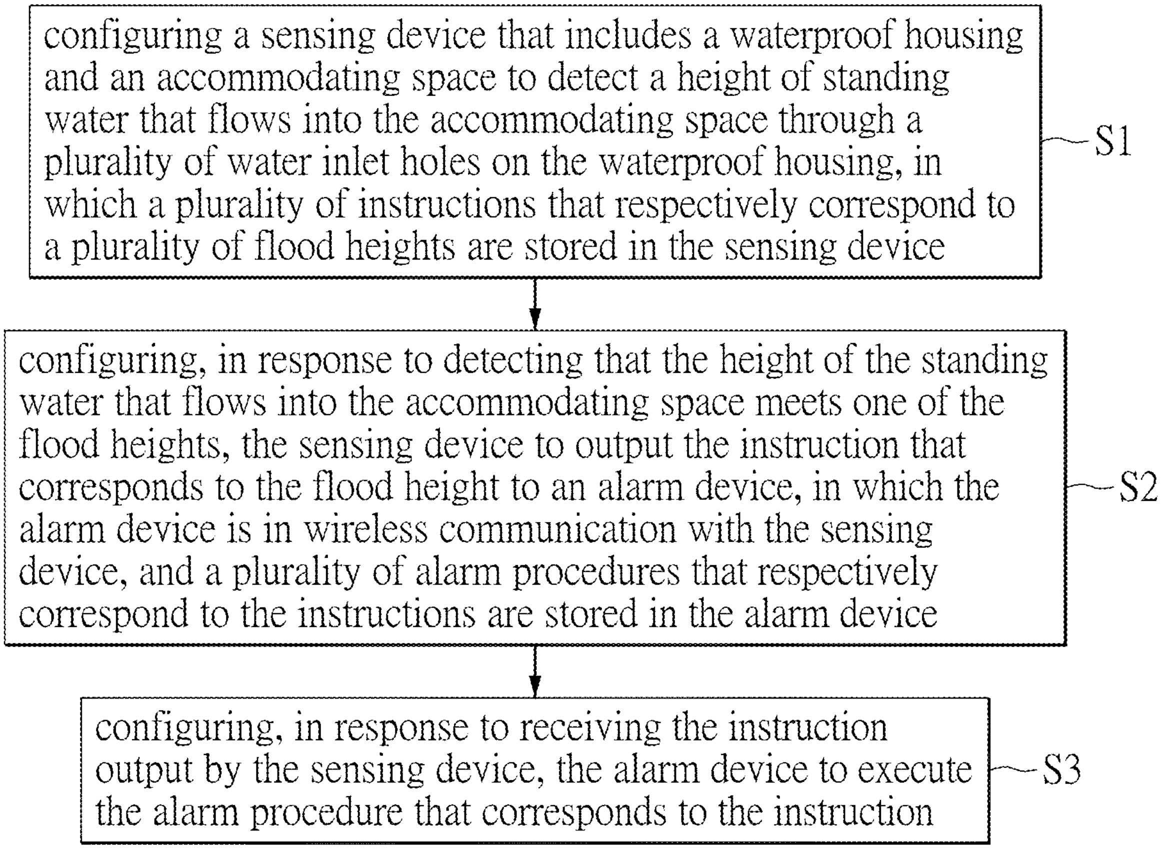
FIG. 6 is a flowchart of a flood alarm method according to the present disclosure.

Reference is made to FIG. 6, which is a flowchart of a flood alarm method according to the present disclosure. As shown in FIG. 6, an embodiment of the present disclosure provides a flood alarm method, in which the sensing device 10 and the alarm device 20 of FIG. 1 are used. The flood alarm method includes the following steps.

Step S1: configuring the sensing device 10 that includes the waterproof housing 11 and the accommodating space 12 to detect the height of the standing water that flows into the accommodating space 12 through the water inlet holes 110 on the waterproof housing 11, in which the instructions that respectively correspond to the flood heights are stored in the sensing device 10.

Step S2: configuring, in response to detecting that the height of the standing water that flows into the accommodating space 12 meets one of the flood heights, the sensing device 10 to output the instruction that corresponds to the flood height to the alarm device 20, in which the alarm device 20 is in wireless communication with the sensing device 10, and the alarm procedures that respectively correspond to the instructions are stored in the alarm device 20.

Step S3: configuring, in response to receiving the instruction output by the sensing device 10, the alarm device 20 to execute the alarm procedure that corresponds to the instruction. Relevant details for this step have already been mentioned in the above paragraphs, and will not be reiterated herein.

Beneficial Effects of the Embodiment

In conclusion, in the flood alarm system and the flood alarm method provided by the present disclosure, by virtue of "the alarm device being in wireless communication with the sensing device," "a plurality of instructions that respectively correspond to a plurality of flood heights being stored in the sensing device," "in response to detecting that the height of the standing water that flows into the accommodating space meets one of the flood heights, the sensing device outputting the instruction that corresponds to the flood height," "a plurality of alarm procedures that respectively correspond to the instructions being stored in the alarm device," and "in response to receiving the instruction output by the sensing device, the alarm device being configured to execute the alarm procedure that corresponds to the instruction," the alarm device and the sensing device can be separate from each other, and the alarm device can execute the alarm procedures of different levels according to different heights of the standing water that are detected by the sensing device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A flood alarm system, comprising:

a plurality of sensing devices, each of the sensing devices includes including a waterproof housing that defines an accommodating space configured to detect a height of a standing water that flows into the accommodating space through a plurality of water inlet holes formed on the waterproof housing; the sensing devices configured to store a plurality of instructions that respectively correspond to a plurality of flood heights; wherein, in response to detecting that the height of the standing water that flows into the accommodating space meets one of the flood heights, the sensing devices output the instruction that corresponds to the flood height;

a plurality of first pairing modules respectively configured to perform group pairing on the sensing devices, so as to divide the sensing devices into a first group and a second group; and a plurality of alarm devices, each respectively including a plurality of second pairing modules, wherein the second pairing modules are respectively configured to perform group pairing on the alarm devices, so as to divide the alarm devices into the first group and the second group;

wherein the sensing devices belonging to the first group and the alarm devices belonging to the first group are configured to be paired with each other to establish wireless communication, and the sensing devices belonging to the second group and the alarm devices belonging to the second group are configured to be paired with each other to establish wireless communication;

wherein a plurality of alarm procedures that respectively correspond to the instructions are stored in each of the alarm devices; wherein, in response to receiving the instruction output by the sensing devices of the same group, the alarm devices are configured to execute the alarm procedure that corresponds to the instruction.

2. The flood alarm system according to claim 1, wherein the alarm procedures include a first alarm procedure, a second alarm procedure, and a third alarm procedure, the first alarm procedure includes sending a flood announcement to an electronic device, the second alarm procedure includes generating a first warning sound, and the third alarm procedure includes generating a second warning sound that is different from the first warning sound.

3. The flood alarm system according to claim 2, wherein the second alarm procedure and the third alarm procedure further include sending a flood alarm to a host.

4. The flood alarm system according to claim 3, further comprising:

a server, wherein the server is connected to the host via an internet, and is configured to provide a real-time image to the host; wherein the real-time image is obtained by a network camera that is disposed adjacent to the sensing devices.

5. The flood alarm system according to claim 4, wherein the host or the electronic device further controls disaster preparedness equipment via the server, so as to carry out a disaster preparedness measure.

6. The flood alarm system according to claim 2, wherein the alarm devices is further configured to record the flood announcement.

7. The flood alarm system according to claim 1, wherein each of the sensing devices includes one or a combination of an infrared water-level detector, a water conductivity sensor, and a float sensor, so as to detect the height of the standing water that flows into the accommodating space.

8. The flood alarm system according to claim 1, wherein one of the alarm devices is in wireless communication with one of the sensing devices via a radio-frequency module, a BLUETOOTH module, or a WI-FI module.

9. The flood alarm system according to claim 1, wherein each of the alarm devices and the sensing devices includes a power module, and the power module is a solar battery for generating electricity to drive the alarm devices and the sensing devices.

10. A flood alarm method, comprising:

configuring a plurality of sensing devices that includes a waterproof housing, that defines an accommodating space, and a first pairing module to detect a height of a standing water that flows into the accommodating space through a plurality of water inlet holes formed on the waterproof housing; the sensing devices configured to store a plurality of instructions that respectively correspond to a plurality of flood heights;

configuring, in response to detecting that the height of the standing water that flows into the accommodating space meets one of the flood heights, each of the sensing devices to output the instruction that corresponds to the flood height;

wherein a plurality of first pairing modules are respectively configured to perform group pairing on the sensing devices, so as to divide the sensing devices into a first group and a second group;

configuring a plurality of alarm devices that each respectively include a plurality of second pairing modules, wherein the second pairing modules are respectively configured to perform group pairing on the alarm devices, so as to divide the alarm devices into the first group and the second group;

wherein the sensing devices belonging to the first group and the alarm devices belonging to the first group are configured to be paired with each other to establish wireless communication, and the sensing devices belonging to the second group and the alarm devices belonging to the second group are configured to be paired with each other to establish wireless communication;

wherein a plurality of alarm procedures that respectively correspond to the instructions are stored in each of the alarm devices; and configuring, in response to receiving the instruction output by the sensing devices of same group, each of the alarm devices to execute the alarm procedure that corresponds to the instruction.

11. The flood alarm method according to claim 10, wherein the alarm procedures include a first alarm procedure, a second alarm procedure, and a third alarm procedure, the first alarm procedure includes sending a flood announcement to an electronic device, the second alarm procedure includes generating a first warning sound, and the third alarm procedure includes generating a second warning sound that is different from the first warning sound.

12. The flood alarm method according to claim 11, wherein the second alarm procedure and the third alarm procedure further include sending a flood alarm to a host.

13. The flood alarm method according to claim 12, further comprising:

connecting a server to the host via an internet, and configuring the server to provide a real-time image to the host for monitoring; wherein the real-time image is obtained by a network camera that is disposed adjacent to the sensing devices.

14. The flood alarm method according to claim 13, wherein the host or the electronic device further controls disaster preparedness equipment via the server, so as to carry out a disaster preparedness measure.

15. The flood alarm method according to claim 11, wherein each of the alarm devices is further configured to record the flood announcement.

16. The flood alarm method according to claim 10, wherein each of the sensing devices includes one or a combination of an infrared water-level detector, a water conductivity sensor, and a float sensor, so as to detect the height of the standing water that flows into the accommodating space.

17. The flood alarm method according to claim 10, wherein each of the alarm devices is in wireless communication with one of the sensing devices via a radio-frequency module, a BLUETOOTH module, or a WI-FI module.

18. The flood alarm method according to claim 10, wherein each of the alarm devices and the sensing devices includes a power module, and the power module is a solar battery for generating electricity to drive the alarm devices and the sensing devices.

* * * * *